United States Patent Office 3,733,360
Patented May 15, 1973

---

3,733,360
PROCESS FOR PREPARING TETRAKIS (DIFLUOR-AMINO) METHANE
William Charles Firth, Jr., 192 Cheese Spring Road, Wilton, Conn. 06897, and Simon Frank, 34 Hazelwood Lane, Stamford, Conn. 06905
No Drawing. Original application May 9, 1963, Ser. No. 280,492. Divided and this application Oct. 22, 1965, Ser. No. 505,307
Int. Cl. C07c 87/22
U.S. Cl. 260—583 NH                                 1 Claim

ABSTRACT OF THE DISCLOSURE

The invention is to a process for preparing tetrakis-(difluoramino)methane, useful as a fuel for rocket propulsion, which comprises reacting bis(difluoramino)fluoraminomethyl isocyanate with fluorine.

---

This application is a division of our copending application, Ser. No. 280,492, filed May 9, 1963.

This invention relates to a novel class of chemical compounds as well as to the methods of preparing the same. More particularly, the present invention is concerned with highly fluorinated aminomethyl compounds and how such compounds are prepared.

It is well known that fluorine is a potent oxidizer for rocket fuels. However, fluorine is a gas having an extremely low boiling point making the use of fluorine for rocket propulsion dependent upon the maintenance of cryogenic conditions.

In order to overcome some of the disadvantages of the use of fluorine, considerable research effort has been devoted to attempting to produce compounds containing a high percentage of available fluorine. In the course of such research it was discovered that fluorine bonded to carbon was not readily available for oxidation of fuels while fluorine bonded to nitrogen was readily available. Accordingly, our research has been directed toward producing compounds having a high percentage of fluorine attached to nitrogen.

Prior research into the preparation of oxidizers having a high percentage of available fluorine, such as $ClF_3$, $BrF_3$, tris(difluoramino)fluoromethane and $FClO_3$ had reached a limit in the progress of technology where the best that could be hoped for from theoretical considerations was a minor improvement in the specific impulse of fuel-oxidizer combinations based on extensive minor modifications of the proportions of fuel to oxidizer, hardware design, etc. In order to make a major improvement in the specific impulse of these fuel-oxidizer combinations, new compounds having a much higher percentage of available fluornne were needed. Quite unexpectedly and without any benefits of prior knowledge in this field we discovered a unique method of producing a highly valuable and heretofore unknown class of fluorine compounds.

The novel highly fluorinated products or adducts of importance may be represented by the following formula:

(I)

wherein Q is a nitrogen-containing moiety selected from the group consisting of —NCO, —NCS, —NFC≡N, —$NF_2$, —NHCF=NF, —NFCF=NF, —$NFCF_2NF_2$, and —$NCFC_3$ and wherein G is selected from the group consisting of fluorine,

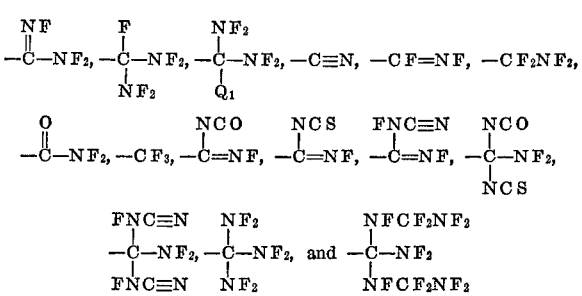

wherein $Q_1$ is the same as Q. Thus, it is the unusual characteristic of these novel highly fluorinated products that they contain a carbon tetranitrogen nucleus with large amounts of readily available fluorine attached to the nitrogens therein.

Among the most outstanding compounds thus produced are: $C(NF_2)_4$ or tetrakis(difluoramino)methane and $(F_2N)_3CNCO$ or tris(difluoramino)methyl isocyanate. These compounds have never been made before, and judging from past knowledge it would appear not possible to produce them.

The novel compounds of the present invention have many uses, particularly for those applications in which highly available fluorine content is desirable. The novel compounds may be used as oxidizers for the oxidation of rocket fuels of the liquid, hybrid, and solid types, explosives, and smoke generators, intermediates for the production of other fluorine-containing compounds, insecticides, herbicides, etc.

The fluorination conditions to produce fluorinated adducts of Formula I may involve generally a concentration of fluorine in the gas of about 4% to 100% by volume. The reaction may be conducted at a temperature of about —50° C. to about +100° C. and at a pressure of about 100 mm. Hg to about 5 atmospheres. The reaction may be instantaneous or take a time up to about 12 hours. The mild reaction conditions generally involve the lower ends of the foregoing ranges and the drastic conditions generally involve the upper ends of the foregoing ranges. Thus, mild conditions generally involve a concentration of fluorine of about 4% to about 20% by volume with a temperature of about —50° C. to about 0° C. at a pressure of about 100 mm. Hg to atmospheric for a time shorter than about a half a minute. Drastic conditions generally involve high fluorine concentration in the gas of more than about 20% by volume with the reaction temperature about 0° C. to about 100° C. at a reaction pressure from about atmospheric pressure to about 5 atmospheres and a residence time from about half a minute up to about 5 hours.

It is to be understood that all of the drastic conditions do not necessarily have to be present for the reaction conditions to be considered drastic nor do all of the mild conditions have to be present for the reaction conditions to be considered mild. Whether the reaction conditions are to be considered "mild" or "drastic" depends upon the net balance achieved by the interaction of all of the conditions involved.

Fluorination of the adduct using either mild or drastic conditions serves to replace the hydrogen introduced onto nitrogen formerly multiply bound to the central carbon with a fluorine so that the —NHF, =NH, or —$NH_2$ group becomes an —$NF_2$ or =NF group.

Illustrative of the products of such fluorination of the adducts within the scope of Formula I are the following:

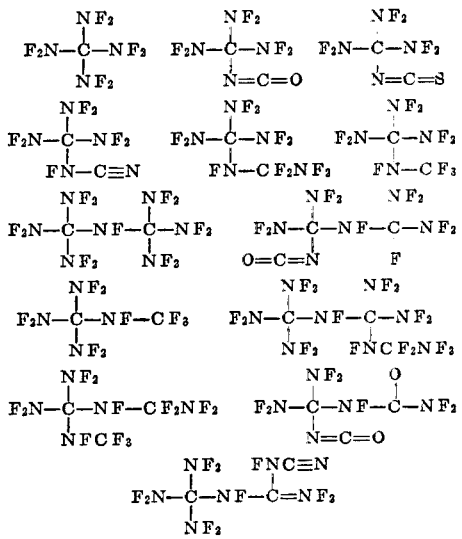

etc.

mate. The yield of bis(difluoramino)fluoraminomethyl isocyanate was about 54%.

EXAMPLE 2

The following example illustrates the fluorination of bis(difluoramino)fluoraminomethyl isocyanate to produce tetrakis(difluoramino)methane and tris(difluoramino) methyl isocyanate.

Bis(difluoramino)fluoraminomethyl isocyanate was fluorinated by sweeping a fluorine-helium gas mixture for an extended period of time at low temperatures over such material. Entrained in the exiting fluorine-helium gas mixture were the reaction products, tetrakis(difluoramino) methane and tris(difluoramino)methyl isocyanate along with assorted by-products as shown in the accompanying table.

These products were collected by passing the exiting fluorine-helium gas mixture containing the products through an HF trap (a U-shaped tube which is filled with sodium fluoride pellets), then through a first cold trap (a U-shaped tube chilled to −78° C. or −196° C.) and then into a second cold trap maintained at −196° C. Non-condensibles at −196° C. were passed out through a bubbler.

TABLE

| | | Fluorination conditions | | | | | Products | | | | |
|---|---|---|---|---|---|---|---|---|---|---|---|
| Run No. | Bis,[1] mmole | He, cc./min. | F2, cc./min. | Temp., °C. | Duration, minutes | Other | Tris,[2] mmole | Yield, percent | Delta,[3] mmole | Yield, percent | Others, mmole |
| 1 | 0.70 | 350 | 0 | −30 | 60 | [4] | 0.16 | 23 | 0.084 | 12 | [5] 0.49 |
| 2 | 1.1 | 350 | 0 | −30 | 60 | [4] | 0.20 | 18 | 0.16 | 14 | [5] 0.48 |
| 3 | 2.16 | 350 | 0 | −30 | 140 | [4] | 0.62 | 28 | 0.48 | 22 | [5] 1.0 |
| 4 | 1.6 | 350 | 0 | −30 | 120 | [4] | 0.41 | 26 | 0.45 | 28 | 1.2 |
| 5 | 1.4 plus 1.0 | 350 | 0 | −30 | 90 plus 80 | [4] | 1.2 | 40 | 1.0 | 43 | 2.5 |

[1] Bis=bis(difluoramino)fluoraminomethyl isocyanate.
[2] Tris=tris(difluoramino)methyl isocyanate.
[3] Delta=tetrakis(difluoramino)methane.
[4] HF trap filled with NaF pellets and at 25° C.
[5] SiF4, NO2 and unknowns.
[6] Fluorination as for Runs 1-4 except that adduct was fluorinated in two portions and products combined.

EXAMPLE 1

The following example illustrates the reaction of perfluoroguanidine with cyanic acid to produce bis(difluoramino)fluoraminomethyl isocyanate.

Equal molar amounts (1.5 mmoles) each of perfluoroguanidine and cyanic acid were condensed at −196° C. into a flamed 1.3 ml. nuclear magnetic resonance tube equipped with a Fisher-Porter needle valve and containing powdered urea as a catalyst (0.15 mmole or 0.0090 gram). The reaction was allowed to proceed at about −30° C. (produced by a magnesium chloride-ice mixture) for about 3 hours followed by about 1 hour at room temperature (about 25° C.).

All products which were volatile at room temperature were isolated by transfer on a vacuum line into a condensing bulb cooled to −196° C. This bulb was then allowed to warm up to room temperature which then permitted vapors to pass from this bulb into a trap cooled to −50° C. (by a calcium chloride-ice mixture) and from this bulb into another condensing bulb cooled to −196° C. The material volatile at −50° C. consisted of small amounts of unreacted perfluoroguanidine and cyanic acid while the material condensed in the −50° C. trap consisted only of bis(difluoramino)fluoraminomethyl isocya- The various products produced by the fluorination of the adducts are generally useful as oxidizers in conjunction with fuels for rocket propulsion. This is because they contain a large proportion of readily available fluorine (attached to nitrogen) for such oxidation reactions.

Also, these adducts and final products may serve as intermediates for the preparation of other compounds by reaction of the isocyanate portion of the C=N or C≡N portions with oxidizers, alcohols, amines, hydration agents, etc., to form other highly fluorinated aminomethyl compounds. As illustrative of the use of one of these compounds, tetrakis(difluoroamino)methane, as an oxidizer for rocket propellants, the following data is presented:

$$I_{sp}$$

| | $I_{sp}$ |
|---|---|
| $C(NF_2)_4 + N_2H_4 + N_2O_4$ | 329 |
| $C(NF_2)_4 + N_2H_4 + FClO_3$ | 322 |
| $C(NF_2)_4 + (CH_3)_2NNH_2 + N_2O_4$ | 320 |
| $C(NF_2)_4 + B_5H_9 + N_2O_4$ | 329 |

$I_{sp}$ is the theoretical specific impulse to be obtained by calulations utilizing the optimum proportions of the three ingredients presented.

In contradistinction to the above, the following data was obtained for previously known oxidizers:

| | $I_{sp}$ |
|---|---|
| $ClF_3 + N_2H_4$ | 295 |
| $FC(NF_2)_3 + N_2O_4 + N_2H_4$ | 314 |
| $FC(NF_2)_3 + N_2H_4 + FClO_3$ | 314 |
| $ClF_3 + B_5H_9$ | 290 |
| $FC(NF_2)_3 + FClO_3 + B_5H_9$ | 314 | from which the higher specific impulses obtainable with tetrakis(difluoroamino)methane can be appreciated.

It is thus seen that $C(NF_2)_4$ shows improved or superior performance with common fuels such as hydrazine, unsymmetrical dimethyl hydrazine, or pentaborane as compared with other known fluorine based rocket oxidizers. Tetrakis-(difluoramino)methane with a melting point of about $-12°$ C. and a boiling point of about $45°$ C. further shows advantages in that it is a storable high energy liquid oxidizer which does not require extensive refrigeration for storage in contrast to other liquid oxidizers such as liquid fluorine, tetrafluorohydrazine, $N_2O_4$, $ClF_3$, etc.

We claim:
1. The process for preparing tetrakis(difluoramino)methane comprising reacting bis(difluoramino)fluoraminomethyl isocyanate with fluorine and separating tetrakis-(difluoramino)methane from the reaction mixture.

References Cited
UNITED STATES PATENTS

| | | | |
|---|---|---|---|
| 3,689,560 | 9/1972 | Wright et al. | 260—583 NH |
| 3,166,595 | 1/1965 | Frazer | 260—583 |
| 3,214,465 | 10/1965 | Sausen | 260—543 |

OTHER REFERENCES

Emeleus et al., Advances in Inorganic Chemistry, vol. 3, 1961, pp. 357–358.

LELAND A. SEBASTIAN, Primary Examiner

U.S. Cl. X.R.

149—22, 36, 109; 260—453 AL, 454, 465.5 R, 584 A